(12) United States Patent
Luedeke

(10) Patent No.: US 8,214,722 B2
(45) Date of Patent: Jul. 3, 2012

(54) METHOD AND SYSTEM FOR SIGNAL ERROR DETERMINATION AND CORRECTION IN A FLEXRAY COMMUNICATION SYSTEM

(75) Inventor: Thomas Luedeke, Oberbergkirchen (DE)

(73) Assignee: Freescale Semiconductor, Inc., Austin, TX (US)

( * ) Notice: Subject to any disclaimer, the term of this patent is extended or adjusted under 35 U.S.C. 154(b) by 864 days.

(21) Appl. No.: 12/304,192

(22) PCT Filed: Jun. 20, 2006

(86) PCT No.: PCT/EP2006/063371
§ 371 (c)(1),
(2), (4) Date: Dec. 10, 2008

(87) PCT Pub. No.: WO2007/147436
PCT Pub. Date: Dec. 27, 2007

(65) Prior Publication Data
US 2009/0193317 A1 Jul. 30, 2009

(51) Int. Cl.
*H04L 12/40* (2006.01)
(52) U.S. Cl. ..................................................... 714/775
(58) Field of Classification Search .................... 714/775
See application file for complete search history.

(56) References Cited

U.S. PATENT DOCUMENTS

| 3,614,623 | A | 10/1971 | McAuliffe |
| 5,727,004 | A * | 3/1998 | Propp et al. ................. 714/798 |
| 5,948,116 | A | 9/1999 | Aslanidis et al. |
| 2004/0091073 | A1* | 5/2004 | Smith et al. ................. 375/355 |
| 2004/0179639 | A1 | 9/2004 | Castlebary et al. |

FOREIGN PATENT DOCUMENTS

| EP | 1315337 A2 | 5/2003 |
| EP | 1355459 A2 | 10/2003 |
| WO | 9506378 A | 3/1995 |

OTHER PUBLICATIONS

Proakis; "Digital Communications"; McGraw-Hill International editions 1995, pp. 446-452.
Kaiser; "Feldbusprotokolle im Automobilbereich: Flexray"; Jul. 7, 2005 www.ida.ing.tu-bs.de/academics/seminars/archiv/downloads/ss2005/Kaiser_SS05.pdf.

* cited by examiner

*Primary Examiner* — Bryce Bonzo

(57) ABSTRACT

A signal error determination and correction system is provided which comprises an error correction value calculation means which processes a predetermined segment of a signal to calculate an error correction value, and a signal correction means and prediction which applies the error correction value to at least part of the signal to correct the part of the signal. The invention further provides a method of signal error determination and correction.

20 Claims, 1 Drawing Sheet

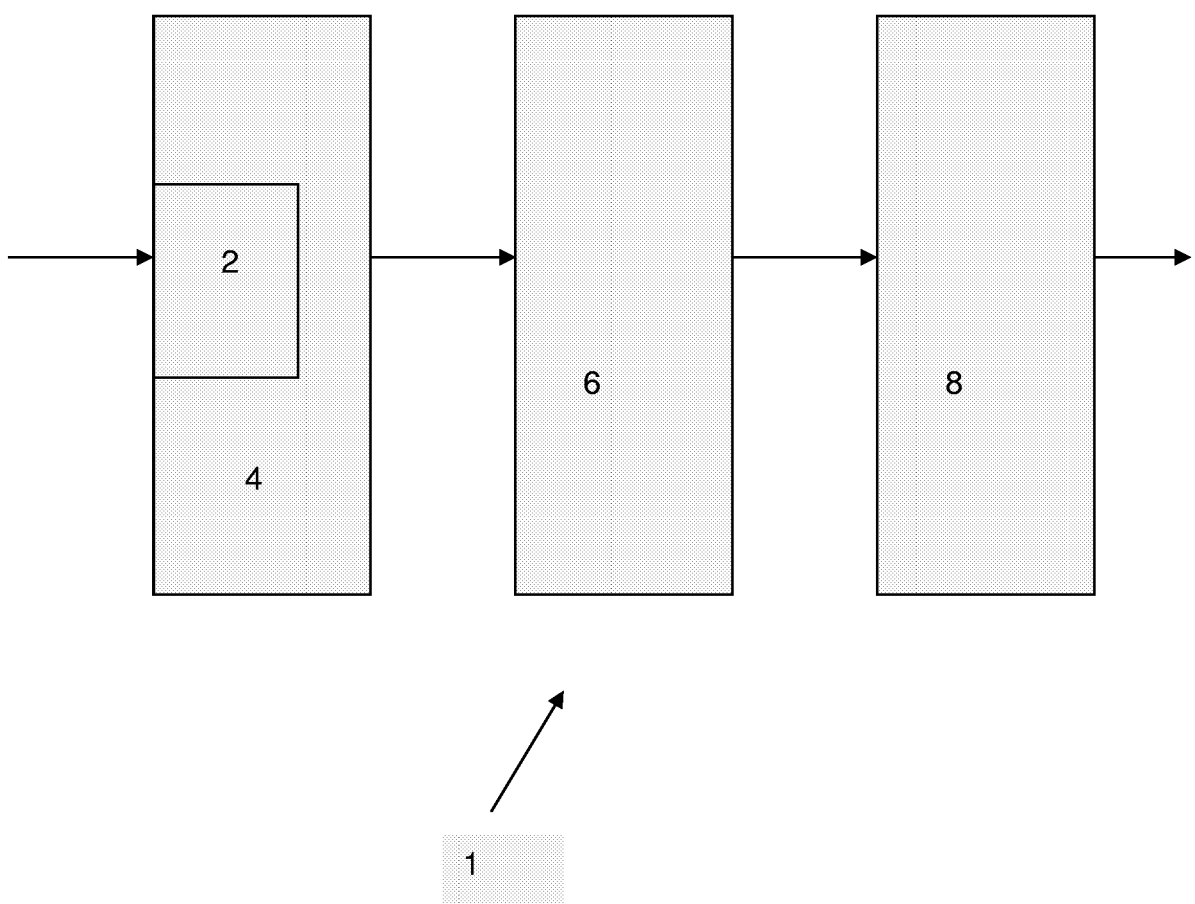

METHOD AND SYSTEM FOR SIGNAL ERROR DETERMINATION AND CORRECTION IN A FLEXRAY COMMUNICATION SYSTEM

FIELD OF THE INVENTION

This invention relates to a method and system for signal error determination and correction. In particular, the present invention relates to a method and system for signal error determination and correction for use in a communication protocol such as the FlexRay automotive communication protocol.

BACKGROUND OF THE INVENTION

Communication protocols have been in existence for some time, and govern the rules and requirements for the sending and receiving of information signal streams, generally comprising a plurality of bits, throughout a communication network. It is usual to undertake some degree of sampling of each bit of information of such a signal stream, to provide a determination of the logic state of the bit of the signal stream. The rate at which sampling is carried out is generally greater than the rate at which bits are transmitted and received. The bit sampling will therefore obtain multiple determinations of the logic state of any bit.

Bit sampling is carried out in the FlexRay communication protocol. The FlexRay communication protocol has been developed by a consortium of automotive manufacturers and semiconductor companies, to provide a distributed control and communication system for automotive applications. In the FlexRay communication protocol, it is required that a receiving node samples a received signal stream of bits, at a pre-determined bit sampling rate, which is greater than the rate at which the signal stream bits are being transmitted to the node. In one implementation, the bit sampling rate and the bit transmission rate are such that the sampling is carried out at eight sample points per bit of the signal stream. The sampling obtains a determination of the logic state of the signal stream bit received at each sample point.

In communication protocols it is known to provide processing of bit samples, to allow some degree of correction for errors in a signal stream.

In the FlexRay communication protocol, each receiving node stores a set of bit samples comprising the five most recently acquired samples of the signal stream. Each time a new sample is acquired, the stored set of samples is updated, and a majority voting operation is carried out on the updated set of samples. If a majority of any set of five most recently-acquired bit samples has a high logic state, then a voted value of the bit of the signal stream is determined to have a high logic state. If a majority of any set of five most recently-acquired bit samples has a low logic state, then a voted value of the bit of the signal stream is determined to have a low logic state. The voted values of the signal stream bits, generated by the majority voting operation on the bit samples, are strobed at a fifth sample point of each of a plurality of eight sample point cycles. The strobing comprises reading the voted value generated at that sample point, and this value is taken to be the logic state of the bit of the signal stream at that sample point and each subsequent sample point, until the voted values are next strobed.

Thus, in the FlexRay protocol, the received signal stream is firstly sampled, and a logic state of the signal stream obtained by the majority voting operation, and then the voted values are themselves sampled, or strobed, and the voted value at a particular sample point taken to be the logic state of the signal stream bits at this point and subsequent points until the voted values are next strobed. Using a majority voting operation on the bit samples, enables the received signal stream to be filtered, and allows some degree of correction of errors, such as glitches, in the received signal stream. However, this is counteracted to some degree by using a fixed strobe point for each cycle. It has been found that this present bit sampling implementation of the FlexRay protocol is not sufficiently robust against, inter alia, clock jitter, clock frequency inaccuracy, noise, and signal distortion, within a FlexRay network. This does not allow implementation of all topologies that the FlexRay communication protocol is intended to support. Improvements in signal error determination and correction are therefore being sought.

U.S. 20040179639 'Technique for over sampling to reduce jitter', uses edge detection to determine bit values.

U.S. 20040091073 'Data recovery circuit, phase detection circuit and method for detecting and correcting phase conditions', shifts the sampling clock to a 'sweet spot', according to a measured phase shift.

U.S. Pat. No. 5,948,116 'Bit error correction algorithm', uses voting of redundant parallel sampling paths to determine bit values.

U.S. Pat. No. 3,614,623 'Adaptive system for correction of distortion of signals in transmission of digital data', measures signal distortion based on an expected reception value, and feeds a correction value back to the transmitter.

SUMMARY OF THE INVENTION

The present invention provides a method and system for signal error determination and correction as described in the accompanying claims.

BRIEF DESCRIPTION OF THE DRAWINGS

FIG. 1 is a block diagram of a signal error determination and correction system in accordance with one embodiment of the invention, given by way of example.

DETAILED DESCRIPTION OF THE PREFERRED EMBODIMENTS

FIG. 1 shows a representation of a signal error determination and correction system 1, which operates according to the method of the invention. This comprises a signal stream interface 2, a sampling means 4, an error correction value calculation means 6, and a signal correction and prediction means 8. The system is contained within a node of a FlexRay communication network, and is connected to the network via the signal interface 4, which is fully compliant with current FlexRay communication protocol signal frame coding. The signal stream interface 2, sampling means 4, error correction value calculation means 6, and signal correction and prediction means 8 are shown as separate units, but it will be appreciated that these can be implemented in for example one unit.

The FlexRay network comprises a plurality of nodes, each of which will contain a system for signal error determination and correction 1. Each node will transmit signals divided into frames, the format of which is set by the FlexRay protocol. Each frame comprises a plurality of bits which make up header information, and a plurality of bits which make up the payload of the frame. The header information will comprise a frame start sequence (FSS) bit, and a byte start sequence (BSS) which comprises a first bit having a high logic state, and a second bit having a low logic state.

Each node of the FlexRay network receives a signal stream, which comprises signals from the other nodes in the network. The signal stream will therefore comprise signal frames from the other nodes of the network. The signal stream also contains a plurality of transmission start sequences (TSS), used to separate the frames in the stream. The position of the first rising edge after a TSS bit sequence, is the start position of the FSS of the frame following the TSS.

In each node, the system for error determination and correction 1 receives a signal stream, via the interface 2. The signal stream is passed to the sampling means 4. The sampling means 4 takes samples of the received signal stream, at a rate of 80 MHz, as defined by the FlexRay protocol. This sample rate determines that each bit of the signal stream should be sampled eight times. (It will be appreciated, however, that different sampling rates and therefore samples per bit may be used). The sampling involves determining a logic state of the signal stream, each time a sample is taken. The sampling means 4 does not carry out any voting operation on the samples, and thus acts as a filterless sampling means. The samples taken by the sampling means 4 are placed in a signal sample stream, which is then passed to the error correction value calculation means 6.

The error correction value calculation means 6 processes the signal sample stream, and calculates an error correction value for each frame in the signal sample stream. Each frame of the signal sample stream is potentially received from a different node of the FlexRay network. Thus each frame will have its own distortion or error characteristics, and an error correction value should be calculated on a frame-by-frame basis.

The error correction calculation means 6 monitors the signal sample stream, to detect the TSS bit sequences contained therein, and therefore the frames in the signal sample stream. The high logic state FSS bit at the start of a frame is followed by the high logic state bit of the BSS, and then the low logic state bit of the BSS. A high logic state two-bit start segment is therefore present at the start of each frame. The falling edge between the high logic state BSS bit and the low logic state BSS, will signal the end of each start segment. When a TSS bit sequence is detected, the error correction value calculation means 6 looks for the position of the next rising edge in the stream, which signals the start of the start segment of a following frame. The error correction value calculation means 6 starts to count the number of samples in the signal sample stream at this point. The error correction calculation means 6 continues to count the samples until the falling edge between the high logic state BSS bit and the low logic state BSS bit is detected, at which point the sample counting is stopped. The number of samples that has been counted for the start segment of the frame, is designated the measured length of this segment.

The error correction value calculation means 6 then subtracts the measured length of the start segment of the frame from the expected length of the start segment of the frame. The sampling means 4 operates at the FlexRay sample rate, and eight samples should be taken for each of the bit. The start segment of the frame comprises two bits, and will therefore have an expected number of samples, or length, of 8×2, i.e. 16.

The difference between the measured and expected lengths of the start segment of the frame, is the error correction value for the frame. As any distortion or error present in a frame is likely to be substantially constant throughout the frame, the calculated error correction value remains valid for the entire frame. If the error correction value is equal to zero, i.e. the expected and measured start segment lengths are equal, no error has been detected in the start segment of the frame, and it is assumed that the frame has been transmitted and received error-free. If the error correction value is not equal to zero, i.e. the expected and measured start segment lengths are not equal, an error has been detected in the start segment of the frame, and it is assumed that the frame has not been transmitted and received error-free. If the error correction value is positive, this indicates that the measured length of the start segment of the frame is shorter than it should be. If the error correction value is negative, this indicates that the measured length of the start segment is longer than it should be. Errors in the frame may arise, for example, from clock jitter, clock frequency inaccuracy, noise, within the FlexRay network, and the errors may give rise to distortion in the signal stream, which in turn will give rise to shorter and/or longer measured lengths of the start segment of the frame.

The error correction value calculated for each frame and the signal sample stream are passed to the signal correction and prediction means 8. A correction is applied to the frame, using the error correction value, even if the error correction value of a frame is equal to zero.

A correction is applied to individual bits of a frame, to give a corrected logic state of the bit. In addition to correcting a bit in a frame, a logic state value is predicted for the next bit in the frame.

Bits of a frame are corrected as follows. The signal correction and prediction means 8 determines the start point of the first bit to be corrected in the frame, which is the second bit of the first BSS of the frame. This is known from the error correction value calculation, as the start of the second bit of the first BSS is the falling edge which signals the end of the start segment used to calculate the error correction value. The signal correction and prediction means 8 detects the falling edge at the start of the first bit, assigns a low logic state to the first bit, predicts the logic state of the following bit, the 'second' bit, to be low, and resets its sample counter to 1.

The signal correction and prediction means 8 then monitors the logic state values of the next eight samples, i.e. the expected number of samples in the first bit. If a rising edge is detected within the eight samples of the first bit, the signal correction and prediction means 8 counts the number of samples from the rising edge to the end of the eight samples of the first bit, adds the error correction value to the counted number of samples, and if the result is greater than or equal to a pre-determined threshold value, which may be for example 4, the signal correction and prediction means 8 assigns a high logic state to the first bit, otherwise it assigns a low logic state to the first bit. In addition, the signal correction and prediction means 8 predicts the logic state of the second bit to be high.

If no edge is detected within the eight samples of the first bit, the signal correction and prediction means 8 assigns a low logic state to the first bit and predicts the logic state of the second bit of the frame to be low.

The second, and subsequent, bits of the frame that are to be corrected, are corrected in substantially the same manner as above. The signal correction and prediction means 8 monitors the logic state values of an eight sample set for each bit.

If a falling edge is detected within an eight sample set, the signal correction and prediction means 8 assigns a low logic state to the bit, predicts the logic state of the following bit to be low, and resets its sample counter to 1.

If a rising edge is detected within an eight sample set, the signal correction and prediction means 8 counts the number of samples from the rising edge to the end of the eight samples of the bit, adds the error correction value to the counted number of samples, and if the result is greater than or equal to the predetermined threshold value, the signal correction and prediction means 8 assigns a high logic state to the bit, otherwise it assigns a low logic state to the bit. In addition, the signal correction and prediction means 8 predicts the logic state of the following bit in the frame to be high.

If no edge is detected within an eight sample set, the signal correction and prediction means 8 assigns a logic state to the bit which is the same as that predicted for the bit when correcting the bit previous to it, and predicts the logic state of the following bit to remain the same.

As each of the bits of the frame is corrected, each corrected bit is output to the remainder of the node as a bit stream. This is of equivalent format to the bit stream produced by the sampling means in the current implementation of FlexRay networks, and will therefore be compatible with the remainder of the node.

For each frame, the signal correction and prediction means 8 acts to determine a current bit logic state, and predict the logic state of the following bit by applying an error correction value based on the measured distortion or error in a frame. A logic state of a bit of a frame is determined using eight sample values, corrected using the error correction value which measures the distortion of the frame. Using eight sample values practically eliminates any signal errors due to glitches, and the correction method of the present invention can accommodate signal distortion much greater than that provided by previous non-corrective and single-sample methods. In particular, the present method offers an improvement over the bit sampling currently implemented in the FlexRay protocol, which simply 'averages' the sample values without any correction.

The method and system of the invention increases bit sampling robustness against signal distortion, and thereby relaxes constraints on the physical topologies which can be implemented within the FlexRay communication protocol.

Modifications and alterations may be made to the above without departing from the scope of the invention.

The invention claimed is:

1. A method of determining and correcting an error in a signal comprising a plurality of bits, the method comprising the steps of:
    processing a predetermined segment of a signal to calculate an error correction value; and
    applying the error correction value to at least part of the signal to correct a value of one or more of the bits in the part of the signal;
    processing the predetermined segment of the signal comprises measuring the length of the predetermined segment of the signal; and
    subtracting the measured length from an expected length of the predetermined segment to calculate the error correction value.

2. A method as claimed in claim 1, wherein measuring the length of the predetermined segment of the signal comprises taking samples of the signal, ascertaining a start point of the predetermined segment of the signal, ascertaining an end point of the predetermined segment of the signal, and measuring the length of the predetermined segment of the signal to be the number of signal samples taken between the start point and the end point.

3. A method as claimed in claim 2 which comprises determining the expected length of the predetermined segment of the signal, by calculating a product of a number of samples taken per bit of the signal, and the number of bits in the predetermined segment of the signal.

4. A method as claimed in claim 2, wherein the signal comprises a frame and the predetermined segment of the signal is the FSS and the first bit of the BSS of the frame.

5. A method as claimed in claim 2, wherein applying the error correction value to one or more of the bits of the signal to correct the one or more bits, comprises monitoring the logic state values of the expected number of samples in one of the one or more bits, and if a rising edge is detected within the samples, counting the number of samples from the rising edge to the end of the samples, adding the error correction value to the counted number of samples, and if the result is greater than or equal to a predetermined threshold value, assigning a high logic state to the bit, otherwise assigning a low logic state to the bit.

6. A method as claimed in claim 1, wherein the signal comprises a frame and the predetermined segment of the signal is the FSS and the first bit of the BSS of the frame.

7. A method as claimed in claim 1, wherein applying the error correction value to one or more of the bits of the signal to correct the one or more bits, comprises monitoring the logic state values of the expected number of samples in one of the one or more bits, and if a rising edge is detected within the samples, counting the number of samples from the rising edge to the end of the samples, adding the error correction value to the counted number of samples, and if the result is greater than or equal to a predetermined threshold value, assigning a high logic state to the bit, otherwise assigning a low logic state to the bit.

8. A method as claimed in claim 7, wherein applying the error correction value to one or more of the bits of the signal to correct the bit, comprises monitoring the logic state values of the expected number of samples in the bit, and if a falling edge is detected within the samples, assigning a low logic state to the bit.

9. A method as claimed in claim 8, wherein applying the error correction value to one or more of the bits of the signal to correct the bit, comprises monitoring the logic state values of the expected number of samples in the bit, and if no edge is detected within the samples of the bit, assigning a logic state to the bit which is the same as that predicted for a previous bit.

10. A method as claimed in claim 7, wherein applying the error correction value to one or more of the bits of the signal to correct the bit, comprises monitoring the logic state values of the expected number of samples in the bit, and if no edge is detected within the samples of the bit, assigning a logic state to the bit which is the same as that predicted for a previous bit.

11. A method as claimed in claim 7, which further comprises predicting a logic state of a bit following the bit to which the error correction value has been applied.

12. A signal error determination and correction system comprising;
    an error correction value calculation means which processes a predetermined segment of a signal comprising a plurality of bits to calculate an error correction value, and
    a signal correction means which applies the error correction value to at least part of the signal to correct one or more of the bits in the part of the signal the error correction value calculation means processes the predetermined segment of the signal by measuring the length of the predetermined segment of the signal, and subtracting the measured length from an expected length of the predetermined segment to calculate the error correction value.

13. A system as claimed in claim 12, further comprising a sampling means which takes samples of the signal, and wherein the error correction value calculation means measures the length of the predetermined segment of the signal using the samples of the signal, ascertains a start point of the predetermined segment of the signal, ascertains an end point of the predetermined segment of the signal, and measures the length of the predetermined segment of the signal to be the number of signal samples taken between the start point and the end point.

14. A system as claimed in claim 13, wherein the signal correction means corrects one or more of the bits, by monitoring the logic state values of the expected number of samples in the one of the one or more bits, and if a rising edge is detected within the samples, counting the number of samples from the rising edge to the end of the samples, adding the error correction value to the counted number of samples, and if the result is greater than or equal to a predetermined threshold value, assigning a high logic state to the bit, otherwise assigning a low logic state to the bit.

15. A system as claimed in claim 12, wherein the signal correction means corrects one or more of the bits, by monitoring the logic state values of the expected number of samples in the one of the one or more bits, and if a rising edge is detected within the samples, counting the number of samples from the rising edge to the end of the samples, adding the error correction value to the counted number of samples, and if the result is greater than or equal to a predetermined threshold value, assigning a high logic state to the bit, otherwise assigning a low logic state to the bit.

16. A system as claimed in claim 15, wherein the signal correction means corrects the one or more bits, by monitoring the logic state values of the expected number of samples in the bit, and if a falling edge is detected within the samples, assigning a low logic state to the bit.

17. A system as claimed in claim 16, wherein the signal correction means corrects one or more bits, by monitoring the logic state values of the expected number of samples in the bit, and if no edge is detected within the samples of the bit, assigning a logic state to the bit which is the same as that predicted for a previous bit.

18. A system as claimed in claim 16, which the signal correction means further comprises a signal prediction means which predicts a logic state of a bit following the bit to which the error correction value has been applied.

19. A system as claimed in claim 15, wherein the signal correction means corrects one or more bits, by monitoring the logic state values of the expected number of samples in the bit, and if no edge is detected within the samples of the bit, assigning a logic state to the bit which is the same as that predicted for a previous bit.

20. A system as claimed in claim 15, which the signal correction means further comprises a signal prediction means which predicts a logic state of a bit following the bit to which the error correction value has been applied.

* * * * *